(12) United States Patent
Reddy et al.

(10) Patent No.: US 11,839,994 B2
(45) Date of Patent: Dec. 12, 2023

(54) TREATMENT OF WOOD WITH ALDEHYDE AND ISOCYANATE

(71) Applicant: HEARTWOOD SUSTAINABLE INDUSTRIES (PTY) LTD, Pretoria (ZA)

(72) Inventors: Goddeti Siva Mohan Reddy, Pretoria (ZA); Steven Chiuta, Pretoria (ZA); Tebogo Ankie Khoza, Pretoria (ZA)

(73) Assignee: HEARTWOOD SUSTAINABLE INDUSTRIES PROPRIETARY LIMITED, Gauteng (ZA)

(*) Notice: Subject to any disclaimer, the term of this patent is extended or adjusted under 35 U.S.C. 154(b) by 628 days.

(21) Appl. No.: 16/961,063

(22) PCT Filed: Jan. 11, 2019

(86) PCT No.: PCT/IB2019/050215
§ 371 (c)(1),
(2) Date: Jul. 9, 2020

(87) PCT Pub. No.: WO2019/138364
PCT Pub. Date: Jul. 18, 2019

(65) Prior Publication Data
US 2020/0398455 A1    Dec. 24, 2020

Related U.S. Application Data

(60) Provisional application No. 62/616,962, filed on Jan. 12, 2018.

(51) Int. Cl.
| | |
|---|---|
| B27K 3/15 | (2006.01) |
| B27K 3/08 | (2006.01) |
| B27K 3/16 | (2006.01) |
| B27K 3/50 | (2006.01) |
| C08G 18/00 | (2006.01) |
| C08G 18/16 | (2006.01) |

(Continued)

(52) U.S. Cl.
CPC ............ B27K 3/15 (2013.01); B27K 3/08 (2013.01); B27K 3/163 (2013.01); B27K 3/50 (2013.01); C08G 18/006 (2013.01); C08G 18/168 (2013.01); C08G 18/1875 (2013.01); C08G 18/7657 (2013.01); B27K 2200/10 (2013.01)

(58) Field of Classification Search
None
See application file for complete search history.

(56) References Cited

U.S. PATENT DOCUMENTS

2011/0151180 A1* 6/2011 Haupt .................. C08G 18/542
524/871

FOREIGN PATENT DOCUMENTS

| CN | 102975248 A | 3/2013 |
| CN | 106217536 A | 12/2016 |

OTHER PUBLICATIONS

International Application No. PCT/IB2019/050215, International Preliminary Report on Patentability, dated May 11, 2020.

(Continued)

*Primary Examiner* — Jeffrey D Washville
(74) *Attorney, Agent, or Firm* — MARSHALL, GERSTEIN & BORUN LLP

(57) ABSTRACT

A method of treating wood includes subjecting the wood to a vacuum environment, and thereafter contacting the wood under positive pressure with an aldehyde and an isocyanate, both the aldehyde and the isocyanate being in liquid form.

15 Claims, 1 Drawing Sheet

(51) Int. Cl.
    *C08G 18/18*     (2006.01)
    *C08G 18/76*     (2006.01)

(56) References Cited

OTHER PUBLICATIONS

International Application No. PCT/IB2019/050215, International Search Report and Written Opinion, dated May 16, 2019.
Rowell, Chemical Modification of Wood, Forest Products Abstracts, vol. 6, No. 12, pp. 363-382 (Dec. 1, 1983).
Younesi-Kordkheili et al., Improving the physical and mechanical properties of particleboards made from urea-glyoxal resin by addition of pMDI, Eur. J. Wood and Wood Products, 76:871-876 (2018) (reportedly published Oct. 14, 2017).

\* cited by examiner

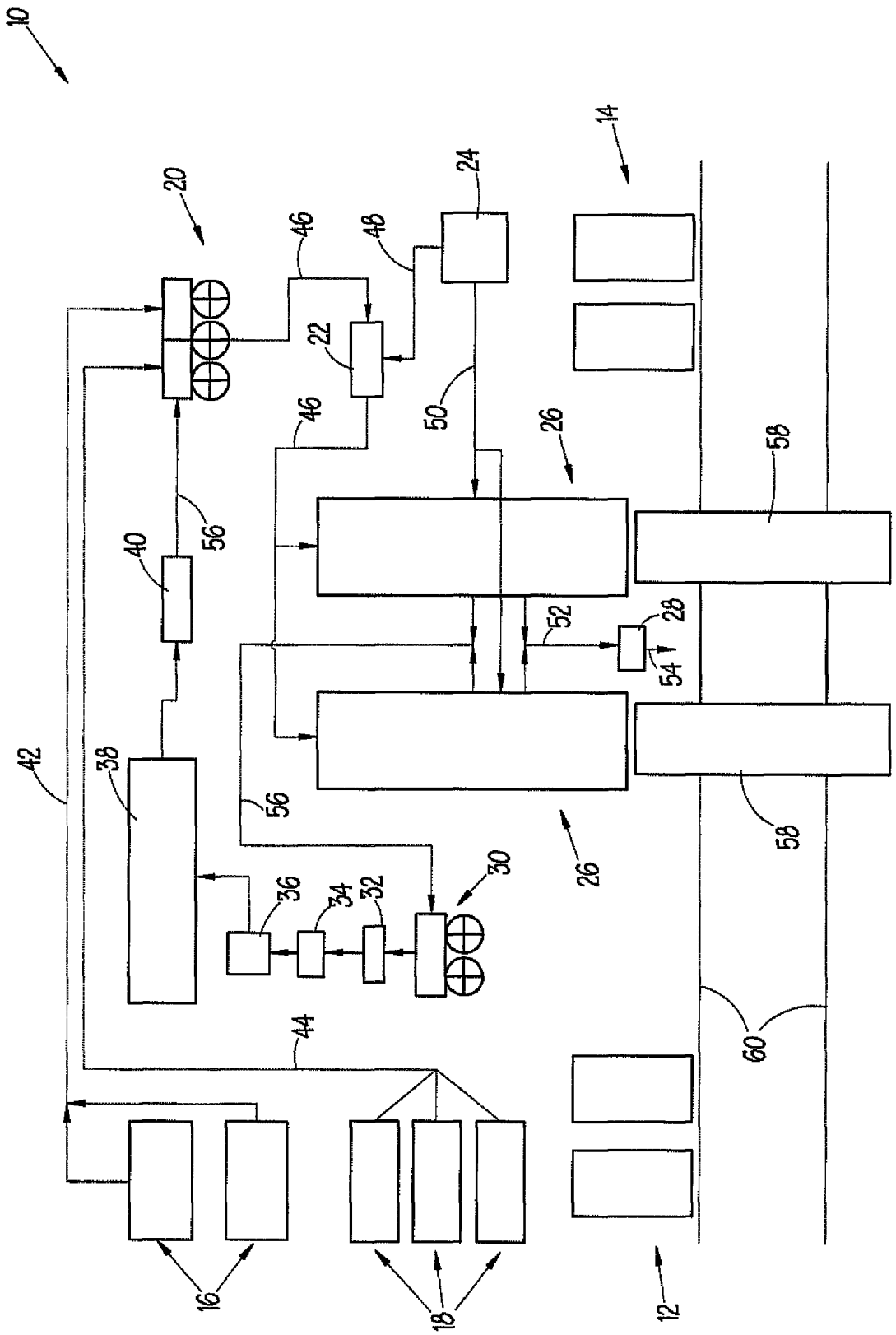

TREATMENT OF WOOD WITH ALDEHYDE AND ISOCYANATE

THIS invention relates to the treatment of wood, wood composites and lignocellulosic by-products of wood. In particular, the invention relates to a method of treating wood, wood composites and/or lignocellulosic by-products of wood.

Wood of species suitable for impregnation with treatment chemicals include the conifers, particularly plantation grown pine species, such as *Pinus Radiata, Pinus Patula* or *Pinus Taeda* as well as several timber species such as aspen, basswood, tulipwood, maple and poplar, which are relatively soft and absorbent, among many others. The use of rain forest hardwoods is contra-indicated in terms of sustainability, climate and ecology. Certain species such as spruce and most eucalypts are relatively impervious to impregnation, although they can be candidates for boron diffusion.

Wood composites such as plywood and medium-density fibreboard (MDF), and lignocellulosic by-products of wood, such as coarse wood particles, can also be treated by impregnation. Typically, fibre derived from wood is however not treated by impregnation.

Modification or treatment of wood (or wood composites or lignocellulosic by-products of wood) by impregnation is typically done for two basic purposes, namely preservation by conferring resistance to biological and insect attack or degradation and improved physical properties such as hardness and strength. In terms of preservation, the use of copper chrome arsenate (CCA) has been very effective. Typical famous trade names associated with CCA treatment are Wolmarisation and Tanalith®. CCA treatment is now banned in many countries, especially in applications where human or animal contact is probable with the treated wood, such as in timber homes, because of heavy metal and arsenic content. Micronised copper is also used as a preservative.

Other preservation treatments include the use of creosote, which is high in phenolics and odorous, as well as the use of boron compounds, often with waxes for water resistance to comply with international standards. Boron compounds are suitable candidates for wood preservation but are water-soluble and must be reliably locked into the wood structure to be effective. For applications such as flooring, decking, stair treads and the like, hardness, water resistance, dimensional stability, machining quality and colour are important.

Furfural alcohol is also used for wood impregnation and preservation. Systems relying on waxes for water repellency have been in evidence for many years and have marginal life expectancy. Methyl methacrylates are used in Canada and the United States for thin veneer flooring products. Great hardness and colour fidelity are achievable, but the resin system is enormously expensive. As mentioned hereinbefore, copper chrome arsenates are under increasing environmental pressure because of the possibility of leached heavy metal salts penetrating ground water. Creosote, a coal tar derivative in oil, has limited penetration, a lot of extrudates and residual odour. The products Accoya® or Tricoya® from the Acosys technology group, also provided by Atlas Lumber Company, as well as Eastman's TruLast (trade name) are based principally on acetic anhydride for acetylisation of hydroxyl groups on the wood cellulose chains and are compliant with the American Wood Preservers Association AWPA standards UC3, UC4 and UC5.

A further treatment is to subject wood (or wood composites or lignocellulosic by-products of wood) to elevated temperatures. A still further method is to react an aminoplast resin or polymer by condensation of the amine or carbamide with a mono or dialdehyde at 40° C. to 100° C. An example is an aliphatic aldehyde such as formaldehyde. Considerable hardness is achieved but at considerable expense. Examples of amines are melamine or triethylamine.

There is thus still a need for an environmentally friendly or beneficial and safe method for the preservation of timber (or wood composites or lignocellulosic by-products of wood). Preferably, such a method should be simple and effective to ensure modification of wood and wood products by vacuum pressure impregnation of the composition in a liquid medium.

Hereinafter in this specification, the term "wood", unless clearly otherwise in the context used, is intended to include wood composites and lignocellulosic by-products of wood, including wood particles and wood chips.

According to one aspect of the invention, there is provided a method of treating wood, the method including subjecting the wood to a vacuum environment; and thereafter, contacting the wood under positive pressure with an aldehyde and an isocyanate, both the aldehyde and the isocyanate being in liquid form.

Typically, the aldehyde and the isocyanate are in the form of a liquid wood treatment composition, preferably an aqueous wood treatment composition, which includes both the aldehyde and the isocyanate.

When in the form of a liquid wood treatment composition which includes both the aldehyde and the isocyanate, the wood treatment composition must have a sufficiently long pot life to allow wood to be treated in accordance with the method of the invention, and preferably for the wood treatment composition to be re-used a few times.

As will be appreciated, as cellulose ethers are polymers produced by the chemical modification of cellulose, cellulose ethers may be present in some lignocellulosic by-products of wood. Typically, acetalysation of the cellulose hydroxyl groups involves acetalysation of the wood cellulose hydroxyl groups in the glucoside linkage of the cellulose. This may be referred to as carbohydrate acetalysation, which is an organic reaction and a very effective means of providing a protecting group. The objective is to remove interstitial gas, but not to vaporize the moisture or volatiles.

Although not wishing to be bound by theory, the inventors believe that the method of the invention involves the reaction of isocyanate functionalities with cell wall hydroxyl groups of wood, leading to the formation of a carbamate ester bonds. No by-product is formed during the reaction, and the chemical bond between the adduct and the cell wall polymers is hydrolytically stable. The isocyanate reaction involves addition to the —C═N— bond, and in reactions involving compounds with an active hydrogen (such as OH groups), this hydrogen bonds to the isocyanate nitrogen. Most compounds that contain a hydrogen atom bonded to oxygen react with isocyanates, and in most of these reactions, aromatic isocyanates are more reactive than aliphatic isocyanates. Aromatic isocyanates are thus preferred. Substitution of electronegative groups on the aromatic ring enhances reactivity and steric hindrance on the isocyanate.

The wood may be contacted with the aldehyde and the isocyanate in the presence of an acetalysation catalyst. The inventors believe that the presence of an acetalysation catalyst is not essential for the method of the invention to work satisfactorily, but that an acetalysation catalyst will advantageously speed up the treatment of the wood. As will be appreciated, the presence of an acetalysation catalyst may however prevent or limit re-use of the wood treatment composition or the aldehyde.

The vacuum environment may be at a negative pressure of up to about 100 kPa, preferably a negative pressure of between about 60 kPa and about 90 kPa, for example a negative pressure of about 85 kPa.

The vacuum environment may be provided in a treatment vessel, e.g. an autoclave.

The wood may be subjected to a vacuum environment for a period of no more than about 40 minutes, preferably no more than about 35 minutes, more preferably no more than about 30 minutes, e.g. about 20 to 30 minutes. Typically, the wood is subjected to a vacuum environment for a period of at least about 10 minutes, preferably at least about 20 minutes.

Contacting the wood under positive pressure with an aldehyde and an isocyanate typically includes submerging the wood in a liquid comprising the aldehyde and the isocyanate, e.g. in a vessel or autoclave, and applying hydraulic pressure. The liquid may be a wood treatment composition as hereinbefore described.

Typically, when the wood or lignocellulosic by-product of wood is in particulate form, the particles are contained within a foraminous or liquid pervious container that is receivable within the treatment vessel.

The positive pressure may be a pressure of at least about 500 kPa (absolute), preferably at least about 600 kPa (absolute), more preferably at least about 700 kPa (absolute), most preferably at least about 800 kPa (absolute), e.g. about 800 kPa (absolute). Typically, the positive pressure is not more than about 1200 kPa (absolute).

The wood may be contacted under positive pressure with the aldehyde and the isocyanate for a period of no more than about 60 minutes, preferably no more than about 50 minutes, more preferably no more than about 45 minutes, most preferably no more than about 40 minutes, e.g. about 20 or about 30 minutes. Typically, the wood is contacted under positive pressure with the aldehyde and the isocyanate for a period of at least about 10 minutes.

The method may include removing liquid comprising the aldehyde and the isocyanate (e.g. the wood treatment composition) from the treatment vessel and returning the liquid to a holding vessel for re-use. The liquid may be returned to the holding vessel by means of compressed air.

The aldehyde may be a dialdehyde, preferably glyoxal. Instead, or in addition, the aldehyde may be glutaraldehyde. Preferably, the aldehyde is not formaldehyde.

The aldehyde may be present in the liquid or in the wood treatment composition in a concentration of between about 30% and about 60% by weight, preferably between about 35% and about 50% by weight, e.g. about 40% by weight.

The isocyanate may be a polymeric isocyanate, e.g. a urethane prepolymer terminated with one or more isocyanate groups. In one embodiment of the invention the isocyanate is a methylene diphenyl diisocyanate (MDI).

The isocyanate may be, or may include, diphenylmethane-4,4'-diisocyanate.

The isocyanate may be selected from the group consisting of Desmodur 44V20 (trade name), Duthane 5005 (trade name), Duthane 2447 (trade name) and Ultra-thane 500-207 (trade name).

The isocyanate may be present in the liquid or in the wood treatment composition in a concentration of between about 5% and about 70% by weight, preferably between about 10% and about 50% by weight, e.g. about 50% by weight.

Varying wood hardness levels can be achieved using different isocyanates, based on the number of isocyanate groups in the particular isocyanate, but the target hardness is the prerogative of the final user or is determined by the application of the wood. When used on their own, isocyanates can increase the hardness of the wood to between 6,000 and 19,000 Newtons. If isocyanates are used in combination with glyoxal and water-soluble boron compounds, the resultant absolute hardness may range between 5,000 Newtons and 9,800 Newtons.

The acetalysation catalyst may be an acid, typically an inorganic acid or mineral acid.

The acetalysation catalyst may be selected from the group consisting of polycarboxylic acids, polycarboxylic acid anhydrides, polycarboxylic acid chlorides, sulphuric acid, phosphoric acid, citric acid, hydrochloric acid, ammonium persulfate, ammonium chloride, and magnesium chloride hexahydrate.

In one embodiment of the invention, the acetalysation catalyst is selected from the group consisting of sulphuric acid, phosphoric acid, citric acid and hydrochloric acid.

Preferably, when present, the acetalysation catalyst is phosphoric acid.

The acetalysation catalyst may be present in a liquid comprising the aldehyde or in the wood treatment composition in a concentration of between about 0.5% and about 10% by weight, preferably between about 1.5% and about 6% by weight, more preferably between about 3% and about 4% by weight, e.g. about 3% by weight. Typically the acetalysation catalyst, e.g. phosphoric acid, is commercially available at a concentration in the range 10% to 70% by dry mass in water.

The wood may be pre-treated with a wood preservative, e.g. a boron compound. The method of the invention will then advantageously lock the boron compound into the wood to prevent or inhibit leaching.

Alternatively, the wood treatment composition may include a wood preservative. In one embodiment of the invention, the wood preservative is a boron compound. Advantageously, as hereinbefore indicated, some boron compounds are water-soluble.

The boron compound may be selected from the group consisting of borax, the deca hydrate of sodium tetraborate, the penta hydrate of sodium tetraborate, boric acid, and disodium octaborate tetra hydrate.

The boron compound may be present in the wood treatment composition at a concentration of between about 6 gram boron/liter of wood treatment composition and about 60 gram boron/liter of wood treatment composition, preferably between about 8 gram boron/liter of wood treatment composition and about 40 gram boron/liter of wood treatment composition, more preferably between about 8 gram boron/liter of wood treatment composition and about 30 gram boron/liter of wood treatment composition, most preferably between about 8 gram boron/liter of wood treatment composition and about 25 gram boron/liter of wood treatment composition.

For example, borax or the deca or penta hydrate of sodium tetraborate solution may be present in the wood treatment composition at a concentration of between about 1% and about 6% by weight. Disodium octaborate tetrahydrate, which has a boric acid equivalent of 940 grams per kg may be added at between 5 kg and 6.5 kg per cubic meter of wood to be treated, which equates to 15.5 gram per liter of wood treatment composition for an uptake of 70% by dry mass of wood or 10 grams for an uptake of 115%.

The boron compound is preferably first dissolved in water at between 50° C. and 70° C., and then blended with other ingredients of the wood treatment composition, such as the aldehyde and the isocyanate and optionally the acetalysation catalyst, in a water solution to provide an aqueous wood treatment composition.

Advantageously, a wood treatment composition which includes glyoxal and an MDI, and optionally a boron compound, has a pot life of about 10 hours, which is more than sufficient for use in the method of the invention.

The wood treatment composition may include a hydrophobic agent.

The hydrophobic agent may be a potassium methyl siliconate, such as Silres® WH or Silres® BS16 available from Wacker Chemie AG, Hauptverwaltung, Hanns-Seidel-Platz 4, 81737, Munich, Germany.

The hydrophobic agent may be present in the wood treatment composition in a concentration of between about 0.02% and about 0.75% by weight, preferably between about 0.08% and about 0.2% by weight, e.g. about 0.15% by weight or about 0.2% by weight.

The aldehyde, e.g. glyoxal and/or glutaraldehyde, forms a cellulosic acetal in the wood or lignocellulosic material being treated. The aldehyde is thus not used as a catalyst, e.g. to form urea or phenol formaldehyde polymers as in the manufacture of wood composites, but rather to acetalyse cellulose (or cellulose ethers) present in the wood. The catalyst for the acetalysation of the cellulose by the aldehyde, e.g. phosphoric acid, when present, in addition to acting as a catalyst also hydrolyses wood celluloses, leading to cellulose phosphate esters and hydrolisates and a further decrease in flammability or the ability of the treated wood to support combustion. The boron compound, when present, may also act as a catalyst, e.g. when in the form of boric acid, and acts as a preservative (against fungal rot or decay, molds and insects) in the lignocellulosic material acetalysation product.

The acetalysation reaction described hereinbefore may also be referred to as the union of an acid with an alcohol or hydroxyl group, also termed esterification, which results in the insolubility in water of the ester reaction product. In the reaction described, the acid (acetalysation catalyst), when present, accelerates or catalyses acetalysation, but may also esterify hydroxyl groups, with boron being a possible catalyst and a wood preservative. Gaseous emissions from the reaction are negligible at room temperature. Advantageously, no formaldehyde is typically present in the wood treatment composition or emitted from glutaraldehyde or glyoxal.

Esterification results in a number of positive esters, e.g. depending on the acid used as catalyst when a catalyst is used. The choice of a catalyst influences the reaction speed. Examples of these esters include formates, citrates, lactates, proprionates, acetates, maleates and the like, caused by reaction of polycarboxylic acids, anhydrides or acid chlorides or other acids. Cross-linking acetalysation forms acetals and esters in the presence of mineral acids such as hydrochloric, citric or sulphuric acid or more preferably phosphoric acid. With the preferred catalyst, a hard acetal is formed, largely depending on the acid concentration, leaving water as a residue. The reaction occurs at room temperature.

As hereinbefore indicated, the lignocellulosic by-product of wood may be in particulate form, i.e. a particulate lignocellulosic by-product of wood. Examples of such a particulate lignocellulosic by-product of wood include wooden biomass particles, wood chips, wood splinters or elongates and the like.

The method of the invention may include drying the particulate lignocellulosic by-product of wood at least partially to form a furnish.

The method of the invention may include providing the wood with a cosmetic effect by treating the wood with a metal complex dye, e.g. by adding a metal complex dye to the wood treatment composition. Metal complex dyes, while not UV stable, typically completely impregnate wood.

The method of the invention may further include using an organic solvent to assist the isocyanate to penetrate the wood easier than could be achieved with the isocyanate alone. The organic solvent may be selected form the group consisting of dichloromethane, acetone, xylene and toluene. In one embodiment of the invention, the wood treatment composition thus includes an organic solvent, such as dichloromethane, acetone, xylene or toluene.

The invention extends to wood when treated by the method as hereinbefore described.

The invention also extends to the use of particulate lignocellulosic by-product of wood treated in accordance with the method of the invention in the manufacture of a pressed lignocellulosic artefact or engineered wood, and to such pressed lignocellulosic artefact or engineered wood.

Advantageously, when dried, this composite material, i.e. pressed lignocellulosic artefact or engineered wood, has a high resistance to fire, or spread of flame, minimal release of particulate or gaseous emissions, a class 0 fire rating and is resistant to insect or micro-organism attack.

The invention will now be described in more detail with reference to the accompanying non-scale diagrammatic drawing and the following discussion and Example.

The single drawing shows a flow diagram of a method of treating wood in accordance with the invention.

Referring to the drawing, reference numeral 10 generally indicates a method of treating wood to convert stacks 12 of untreated wood into stacks 14 of treated wood.

The method 10 generally employs tanks 16 each for holding a wood treatment composition, tanks 18 each for holding one or more additional wood treatment materials not incorporated into the wood treatment compositions held by the tanks 16, a feed valve station 20, a holding tank 22, a compressed air tank 24 with a compressor (not shown) to maintain the tank 24 at a desired air pressure, a pair of autoclaves 26, a vacuum pump 28, a separator 30, a further holding tank 32, a filter 34, a pump 36, a further holding tank 38 and a pump 40. The holding tank 22 has a volume about the same as that of an autoclave 26.

A wood treatment composition feed line 42 leads from the tanks 16 for wood treatment composition to the feed valve station 20, via a pump (not shown). Similarly, an additional wood treatment materials feed line 44 leads from the tanks 18 for additional wood treatment materials to the feed valve station 20 via a pump (not shown). A fully-mixed wood treatment solution feed line 46 leads from the feed valve station 20 to the holding tank 22 and from the holding tank 22 into the autoclaves 26. A compressed air feed line 48 leads from the compressed air tank 24 to the holding tank 22 to push out and discharge the treatment composition into the autoclaves 26. A compressed air feed line 50 also leads from the compressed air tank 24 to the autoclaves 26 to supply the hydraulic positive pressure for impregnation cycles.

The vacuum pump 28 is in flow communication with the autoclaves 26 by means of a vacuum line 52, and vents to atmosphere by means of a vent line 54. The vacuum is intended to eliminate or take out air and moisture from the wood before starting a positive pressure impregnation. The wood treatment composition is fed into the autoclaves 26 under vacuum.

A wood treatment solution withdrawal line 56 leads from a bottom of each autoclave 26 to the separator 30, and from there to the holding tank 32, the filter 34, the holding tank 38 and the pump 40, to lead back to the feed valve station 20.

Although not shown in the drawing, the method 10 further employs numerous flow meters, control valves for controlling flow and pressure and for isolating vessels, as well as controllers, such as programmable logic controllers, to control valves, pumps and the like.

Wood to be treated, in the form of planks, is pre-dimensioning and inspected. Thereafter, the planks are stacked on spacers or ties to form the stacks 12 of untreated wood. A stack 12 of untreated wood is then loaded onto a trolley 58 and transported by means of the trolley 58, which runs on rails 60, to one of the autoclaves 26. From the trolley 58, the wood to be treated is then fed into the horizontally extending autoclave 26 through an open end of the autoclave 26, whereafter the autoclave 26 is closed and sealed.

Wood treatment solution, comprising a wood treatment composition which includes an aldehyde and an isocyanate admixed with any additional wood treatment materials that are required, is withdrawn from the holding tank 38 by means of the pump 40 and the wood treatment solution withdrawal line 56 and fed to the valve station 20. As will be explained in more detail hereinafter, the holding tank 38 holds wood treatment solution that is being recycled or reused.

Typically, the wood treatment composition comprises an aqueous solution of glyoxal and/or glutaraldehyde, isocyanate (e.g. an MDI), phosphoric acid (if an acetalysation catalyst is being used), a boron compound (e.g. borax or a borate or boric acid) and a hydrophobic agent such as Silres® WH or Silres® BS16. If desired, the tanks 16 may each hold a different formulation of the wood treatment composition. It is however to be appreciated that a composition which includes an aldehyde such as glyoxal and an isocyanate such as an MDI has a limited pot life and it is thus likely that relatively small batches of such wood treatment compositions would have to be prepared and stored, and that they would have to be used soon after preparation, e.g. within about 10 hours. It is also to be born in mind that if an acetalysation catalyst is being used, the wood treatment composition or liquid would be unsuitable for frequent re-use, so that its recycle potential would be quite limited.

If it is necessary to make up the wood treatment solution, wood treatment composition from one of the tanks 16 for wood treatment composition is fed to the feed valve station 20 by means of the wood treatment composition feed line 42. Similarly, if it is necessary to add additional wood treatment material, for example a dye or a hydrophobic agent if not included in the wood treatment composition, to the wood treatment solution, additional wood treatment material is withdrawn from one or more of the tanks 18 for holding additional wood treatment material and fed by means of the additional wood treatment materials feed line 44 to the feed valve station 20.

From the feed valve station 20, the wood treatment solution is pumped to the holding tank 22 by means of a pump (not shown) and the wood treatment solution feed line 46. Feeding of all streams to the feed valve station 20 and mixing of the streams in the feed valve station 20 are controlled by a programmable logic controller (not shown).

Typically, the holding tank 22 is elevated above the autoclaves 26 and the wood treatment solution feed line 46 between the feed valve station 20 and the holding tank 22 is thus provided with a non-return valve (not shown).

The autoclave 26 with the wood to be treated is evacuated by means of the vacuum pump 28 and the vacuum line 52, with the evacuated air being vented to atmosphere via the vent line 54. Typically, the vacuum pump 28 is a two-stage vacuum pump with an installed vacuum ballast tank to speed the drawing of a vacuum in the autoclave 26. The autoclave 26 is typically evacuated to a vacuum of −85 kPa (gauge) and maintained at that negative pressure for a period of 10 to 20 minutes, depending mainly on the dimensions of the planks or pieces of wood to be treated, and in particular the thickness thereof.

The autoclave 26 with the wood to be treated is then abruptly filled with wood treatment solution, at about ambient temperature, from the holding tank 22, immediately pressurised to a positive pressure of up to about 10 bar (absolute) and kept at that pressure for a minimum of 30 minutes. The wood treatment solution is transferred from the holding tank 22 to the autoclave 26 using gravity and a large bore pipe. Instead, or in addition, compressed air from the compressed air tank 24 can be used to transfer the wood treatment solution into the autoclave 26. This compressed air is also used to maintain the autoclave 26 under positive pressure.

After the planks or pieces of wood have been submerged in the wood treatment solution for a sufficient period of time, e.g. 30 minutes, the wood treatment solution is transferred by means of compressed air from the autoclave 26 along the water treatment solution withdrawal line 56 to the separator 30, which removes larger particles such as particles of wood or stone. The wood treatment solution then passes through the holding tank 32 to the filter 34 which removes any resin reaction particles and fine material, whereafter the wood treatment solution is pumped by means of the pump 36 back to the holding tank 38 for reuse (if possible).

If necessary or required, the vacuum pump 28 can be used to apply a post-treatment vacuum (final vacuum) to the treated wood in the autoclave 26 to remove excess wood treatment solution and avoid a kick-back effect, while assisting the timber to dry.

Once the treatment of the wood has been completed, the pressure in the autoclave 26 is equalized with the environment, the autoclave 26 is opened and the treated planks or pieces of wood are removed, by means of one of the trolleys 58, and stacked as the stacks 14 of treated wood to dry, without further handling. Treated MDF boards are stacked vertically, after post-treatment pressing (not shown) to pretreatment thickness or preferably thinner, to ensure best fiber to fiber contact for maximum strength, water penetration resistance when dry and to ensure dimensional accuracy and completeness of chemical reactions.

The catalyzed acetalysation reaction between the aldehyde and the cellulose hydroxyl groups present in the wood is rapid. The holding tanks 16 are sufficiently large to keep the aldehyde or isocyanate for approximately 4 days. Typically, inspection facilities are provided at every stage of the method 10. All wood treatment solution residue is removed from vessels and pipes by compressed air between the treatment of batches of wood and a plant water flush is carried out at suitable intervals. The autoclaves 26 are typically both used, one being emptied of treated wood and readied for another batch whilst the other is being used to treat wood. A 24-hour operation is thus possible with the method of the invention. Solution stability of any dissolved boron compounds is carefully monitored and if required, the wood treatment composition may be passed through a heated section or heat exchanger (not shown) at or proximate to the feed valve station 40, or alternatively the tanks 16 for wood treatment composition may be heated, or the withdrawal line 56 may be provided with a heated section or heat exchanger.

The method 10, with some modification, can also be used to treat particulate wood or particulate lignocellulosic by-product of wood. Typically, when the wood or lignocellulosic by-product of wood is in particulate form, the particles are contained within a foraminous or liquid pervious container, e.g. an elongate perforated stainless steel drum, that is receivable within the autoclaves 26, with the trolleys 58 being used to transport the drums to and from the autoclaves 26.

It is imperative in the upgrading or treating of wood to control the level at which the wood is modified, in other words, to control solids uptake by the wood. This is determined by taking the average mass increase of the treated wood after impregnation, i.e. the total uptake of an impregnating composition per unit of dry weight of the treated timber. In pine this is typically from 0.6 gram to 1.15 gram of impregnating composition to 1 gram of the treated dry wood. Soft maple would typically be 0.50 to 1.15 gram, black wood typically 0.5 gram and bass wood typically 1.75 gram. Obviously the mass increase per gram of impregnated material is also very dependent on the density of the material itself. The less dense the wood to be treated, the higher the apparent uptake which can be misleading, but the cellular structure of timbers vary and the uptake characteristic is critical to cost control.

Cost control is by varying the solids percentage in the impregnating composition depending upon the uptake characteristics of the wood being treated and the end application to which it is to be applied.

When treating wood by impregnation, the following points are important to bear in mind:

(i) The wood should be machined to within 1 mm of its final tolerance. It should be borne in mind that water can swell the timber by up to 5% during the process.

(ii) The timber must be very carefully stacked straight, with stickers or spacers or ties and, if necessary, clamped.

(iii) It is best to have a configuration in an impregnation plant whereby the impregnating or treatment composition is piggy-backed over (i.e. elevated above) an impregnation cylinder or vessel (e.g. an autoclave) in which the wood is treated or certainly in resin tanks or holding tanks with a sufficient head. After a vacuum cycle, which typically lasts about 20 minutes down to a vacuum of about −85 kPa (gauge), the impregnating composition should be allowed into the autoclave through large diameter pipes by cascade, and immediately subjected to hydraulic pressures of up to 2000 kPa, typically for a further 30 minutes. When returning the treatment composition to a holding tank, compressed air should be used. It is important that mechanical pumps are not used for transfer as energy induction can cause instability. In addition, it is important that sieves are installed in the hydraulic system.

(iv) The impregnation plant should be of stainless steel.

(v) It is important that the aldehyde is sufficiently reactive and if necessary pre-catalysed so that on removal of the water (produced by the acetalysation of the cellulose) together with the treatment composition when the treatment composition is returned to a holding tank, the acetalysation can proceed to completion at relatively low temperatures, preferably not greater than ambient. The reaction product of the acetalysation of the cellulose in the wood has the phenomenon of bulking or expanding at ambient temperature and contracting when heated. The bulking is contributive to dimensional stability.

(vi) It is important that the catalyst allows the aldehyde to be reliably latent in use. It is also important that holding tanks (i.e. treatment composition holding vessels) should not contain too great a volume, that the impregnation plant operates full time, and that at the end of a given working cycle the minimum amount of treatment composition is left. The remaining treatment composition is transferred to a holding tank and all the pipes should be flushed with an appropriate solvent, preferably water.

(vii) The speed of water withdrawal at different temperatures and pressures should be determined. The aim is to dry the treated wood in conventional kilns. The reactants cannot move through the wood or composite during drying because the reaction is too rapid.

(viii) In wood selection it is very important that consistent impregnation right through the depth of the timber and consistently throughout its body is achievable. Otherwise, variable hardness and colour will result.

(ix) It is important that chemical reactions are allowed to go to completion after the removal of water, to prevent leaching. Wherever wood is to be exposed in any way to the atmosphere, removal of any of the active ingredients into the ground water is undesirable. For interior timbers, that is not a critical issue, but water staining of the treated wood is undesirable.

(x) It is important that the wood does not change colour dramatically after treatment. A slight darkening of all woods is normal on exposure to atmospheric oxygen over a period of time. However, phenolics are characterised by a dramatic colour change if the wood treatment composition is not very carefully controlled. In the method of the invention, slight colour change takes place as a function of the reactants, to a reddish or brownish hue.

A desirable outcome of the method of the invention is to improve the way wood machines or finishes. Water miscible or soluble insecticide and biocide is contributed by the glutaraldehyde or glyoxal or a blend thereof and the resultant acetal, and the boron compound dissolved in the reactive carrier water, which after desiccation locks the preservative into the biomass matrix by now being in an insoluble form and preventing the leaching of these preservative chemicals. The isocyanate in combination with the aldehyde provides a desired hardness level.

One major application of wood modified in accordance with the method of the invention is exposed wood flooring. This is strip flooring, which is either solid wood, which is the premium product in the market, or alternatively sliced to thicknesses of 2 mm to 4 mm and laminated to core products such as medium-density fibreboard (MDF) (or more preferably to lightweight cement board) to produce what is called lamel or laminate flooring. Another major, possibly more important application is in construction, preferably above ground.

Producers of solid floors supply the top end of the professional and residential markets. The principal woods used are oak and beech. The rain forest hardwoods such as merbau are used less frequently than in the past, as a result of environmental concerns.

The middle range, in terms of price, is occupied by sliced wood or heavy veneer onto an MDF core with a balancing layer, generally of phenolic modified paper. The low end of the market is occupied by melamine laminate, i.e. a high-density fibreboard (HDF) core and balancer.

EXAMPLE

A typical composition of a wood treatment composition for use in the method of the invention for the impregnation of pre-planed Patula (pine wood) is provided below.

Glyoxal—800 grams to 2000 grams

Isocyanate—1500 to 2500 grams

Topro 94 (trade name)—30 to 40 grams (first dissolved in 400 grams hot water)

Topro 94 is a commercially available borate-based preservative powder for pressure or diffusion treatment of timber, available from Timberlife (Pty) Ltd of 31 Axle Street, Silverton Extension 52, Pretoria, South Africa. It has a boric acid equivalent of 939 g/kg minimum.

The wood treatment composition has a total volume of about 3 litres.

Using the wood treatment composition of this Example, four different sizes of pine wood planks were treated.

During treatment of the pine wood planks with the wood treatment composition of the Example, in accordance with the method of the invention, the pine wood was subjected to a vacuum environment for about 30 minutes, and then submerged in the wood treatment composition under a hydraulic pressure of about 1200 kPa for a period of 30 minutes. The following table sets out some of the results obtained using slight variations of the wood treatment composition.

TABLE 1

| | Sample 1 | Sample 2 | Sample 3 | Sample 4 |
|---|---|---|---|---|
| Size (mm) | 135.01 × 69.55 × 19.88 | 135.41 × 69.71 × 21.06 | 135.38 × 69.31 × 19.78 | 133.85 × 69.95 × 21.10 |
| Dry weight (g) | 95 | 90 | 95 | 85 |
| Wet weight (g) | 262.05 | 230 | 221.5 | 249 |
| Wet size | 135.52 × 71.77 × 20.66 | 136.04 × 72.03 × 21.57 | 135.89 × 71.12 × 20.40 | 134.22 × 72.11 × 21.84 |
| Volume dry (cm3) | 186.65 | 198.79 | 185.59 | 197.55 |
| Volume wet (cm3) | 200.33 | 211.36 | 197.15 | 211.38 |
| Bulking % and % Mass increase | 7.32% and 175% | 6.32% and 155% | 6.23% and 133% | 7.0% and 192% |
| Hardness increment with respect to control | 45% | 150% | 370% | 100% |

The average bulking on volume increase achieved was between 6.2 to 7.3%. The average uptake as a percentage of the dry mass of the timber piece was between 130 to 185%. The average dry density was 0.47 gram/cm$^3$ or kg/m$^3$, whereas the average wet density was 1.26 gram/cm$^3$ or kg/m$^3$. The cost per cubic meter of wood treated was about US$252.

The method of the invention, in at least some embodiments, as illustrated or exemplified, provides at least some of the following advantages:

(i) Marginal woods such as pine and the marginal hardwoods in the temperate forests, such as aspen, basswood, tulipwood, maple and poplar are not suitable for flooring, without having been upgraded by a suitable technology. All wood species suitable for impregnation are suitable for all construction applications above ground. The method of the invention provides such suitable technology.

(ii) The method of the invention imposes dimensional stability, hardness and water resistance and improved machining with excellent preservation by locking into the wood by cross-linkage, biocides and insecticides such as boron compounds. The dimensional stability is a function of cellulose acetalysation bulking and the use of hydrophobic agents to minimize water ingress and prevent leaching. Importantly, patina is also improved. With a degree of modification requiring only sanding initially at 220 grit followed by 400 grit a surface polish is achievable that requires no further maintenance but oiling or polishing, i.e. no lacquer application is required.

(iii) Wood flooring is the fastest growing flooring market in the developed world. Construction, as ever, is one of the world's greatest needs. The method of the invention can fulfil a need for treated wood for wood flooring and above ground construction, i.e. not submerged in soil.

(iv) Rain forest hardwoods, from which most modern wooden windows are manufactured, are no longer an acceptable product. The method of the invention can provide treated wood to replace rain forest hardwoods.

(v) The method of the invention allows use of hydrophobic agents such as Silres® BS16 or Silres® WH provided by Wacker Chemie AG, being a potassium methyl siliconate or similar. Alternatively the following water repellents from Dow Corning can also be used in the method of the invention i. Self cross-linking water soluble siloxane: Dow Corning® 1-6184.

ii. Alkoxysilane functional perfluoro polyether: Dow Corning® 2634.

iii. Water repellent emulsion 60% active or concentrate silanesiloxane dilutable in water:
　　Dow Corning® IE-6683
　　Dow Corning® IE-6689
　　Dow Corning® IE-6694 (water repellent emulsion)

Typical rates of addition to the wood treatment composition are from 0.005% to 2% by weight.

Improved resistance to water wetting or penetration and a reduction of water movement in the wood by capillarity or leaching is achieved.

(vi) Glutaraldehyde and glyoxal are highly effective antibacterial agents active against a broad range of gram positive and gram negative bacteria, fungi, bacterial spores, algae and viruses. Resistance to termites and other insects is provided.

(vii) Salts of boron also provide effective control of certain microbes, but especially of insects such as wood borer and termites, and also exhibits the phenomenon of diffusion through wood tissue. Boric acid can act as a catalyst, as a preservative against all biological or microbial attack and all insects, especially termites and borers.

(viii) Hardness is improved, as measured by the force in Newtons required to penetrate a steel ball to 50% of its diameter into the wood tested, referred to as the Janka Ball test. Examples for untreated wood include basswood—1,500 Newtons, pine—2,500 Newtons, red oak—5,000 Newtons. Hardness objectives for treated wood are a minimum of 6,000 Newtons to 12,000 Newtons with sufficient modification to allow polish by final sanding at 400 grit.

(ix) Colour modification is possible, e.g. by using metal complex dyes to impose rich, natural colours, or any colours for patterning. Alternatives are micronized materials, usually iron oxides, for surface tinting in coatings for UV resistance.

(x) The method of the invention provides particulate lignocellulosic by-products of wood, such as biomass particles, chips, or small elongates, and also structural or engineered wood products (plywood) with improved hardness, improved mechanical properties and improved resistance against insect or microbial attack. The treated particulate material can be formed, after drying, into boards, panels, studs, siding or other construction products showing improved mechanical properties and resistance against insect or microbial attack.

The invention claimed is:

1. A method of treating wood to improve at least the hardness of the wood, the method including
   subjecting the wood to a vacuum environment;
   thereafter, contacting the wood under positive pressure for a period no more than 60 minutes with glyoxal and diphenylmethane-4,4'-diisocyanate, both the glyoxal and the diphenylmethane-4,4'-diisocyanate being in liquid form;
   reacting isocyanate functionalities with cell wall hydroxyl groups of the wood, forming carbamate esters; and
   acetalysing cellulose or cellulose ethers in the wood, forming cellulosic acetal.

2. The method of claim 1, wherein the glyoxal and the diphenylmethane-4,4'-diisocyanate are in the form of a liquid wood treatment composition which includes both the glyoxal and the diphenylmethane-4,4'-diisocyanate.

3. The method of claim 2, wherein the wood treatment composition is an aqueous wood treatment composition.

4. The method of claim 1, wherein the wood is contacted with the glyoxal and the diphenylmethane-4,4'-diisocyanate in the presence of an acetalysation catalyst.

5. The method of claim 4, wherein the acetalysation catalyst is selected from the group consisting of polycarboxylic acids, polycarboxylic acid anhydrides, polycarboxylic acid chlorides, sulphuric acid, phosphoric acid, citric acid, hydrochloric acid, ammonium persulfate, ammonium chloride, and magnesium chloride hexahydrate.

6. The method of claim 1, wherein the vacuum environment is a negative pressure of between 60 kPa and 90 kPa.

7. The method of claim 1, wherein the positive pressure is a pressure of no more than 1200 kPa (absolute).

8. The method of claim 2, wherein the wood treatment composition includes a wood preservative in the form of a boron compound.

9. The method of claim 1, which includes using an organic solvent selected form the group consisting of dichloromethane, acetone, xylene and toluene to assist the diphenylmethane-4,4'-diisocyanate to penetrate the wood easier than could be achieved with the diphenylmethane-4,4'-diisocyanate alone.

10. The method of claim 1, wherein the wood is in the form of a particulate lignocellulosic wood product, the method further including drying the particulate lignocellulosic wood product at least partially to form a furnish.

11. The method of claim 10, further comprising forming a pressed lignocellulosic artefact or engineered wood from the particulate lignocellulosic wood product obtained from the method of claim 10.

12. The method of claim 3, wherein the wood treatment composition includes a wood preservative in the form of a boron compound.

13. The method of claim 1, wherein the wood is subjected to the vacuum environment for a period of no more than 40 minutes.

14. The method of claim 1, wherein contacting the wood under positive pressure with the glyoxal and the diphenylmethane-4,4'-diisocyanate includes submerging the wood in a liquid comprising the glyoxal and the diphenylmethane-4,4'-diisocyanate and applying hydraulic pressure.

15. The method of claim 1, wherein the wood is contacted under positive pressure with the glyoxal and the diphenylmethane-4,4'-diisocyanate for a period of no more than 50 minutes.

* * * * *